US012627958B2

(12) United States Patent
Saunders

(10) Patent No.: US 12,627,958 B2
(45) Date of Patent: May 12, 2026

(54) RADIO FREQUENCY COMMUNICATION VIA PLUG AND RECEPTACLE ARRANGEMENT

(71) Applicant: Intel Corporation, Santa Clara, CA (US)

(72) Inventor: Bradley N. Saunders, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/849,925

(22) Filed: Jun. 27, 2022

(65) Prior Publication Data

US 2022/0330001 A1     Oct. 13, 2022

(51) Int. Cl.
*G06F 13/38*          (2006.01)
*H04W 4/80*          (2018.01)

(52) U.S. Cl.
CPC ............ *H04W 4/80* (2018.02); *G06F 13/382* (2013.01); *G06F 2213/0042* (2013.01)

(58) Field of Classification Search
CPC ................... G06F 13/38; G06F 13/382; G06F 2213/0042; H04W 4/80
See application file for complete search history.

(56) References Cited

U.S. PATENT DOCUMENTS 9,069,697 B2 * 6/2015 Solomon ............... G06F 13/426
10,045,440 B1 * 8/2018 Schultz .................. H01R 43/20

OTHER PUBLICATIONS

Bob Dunstain et al., USB DevDays Active Cable, USB Developer Days 2019—Taipei, Taiwan, Nov. 20, 2019, pp. 1-47.

* cited by examiner

*Primary Examiner* — Tuan H Nguyen
(74) *Attorney, Agent, or Firm* — Gray Ice Higdon, PLLC

(57)          ABSTRACT
In one embodiment, a method includes: detecting, in a computing device, attachment of a surface connector to the computing device and discovering one or more operational characteristics of the surface connector via a wired configuration channel; configuring the connector to communicate with the computing device via at least one wireless channel based on the one or more operational characteristics; and communicating data with the surface connector via the at least one wireless channel. Other embodiments are described and claimed.

20 Claims, 7 Drawing Sheets

600

RADIO FREQUENCY COMMUNICATION VIA PLUG AND RECEPTACLE ARRANGEMENT

BACKGROUND

Universal Serial Bus (USB) connectivity is used to attach a wide variety of peripheral devices to many different computing devices. Based on traditional pin and socket solutions, USB cable connections have limitations in terms of durability, moisture resistance and even data performance.

DETAILED DESCRIPTION

In various embodiments, a near-field, radio frequency (RF)-coupled signaling interface may be provided for a surface-based connector, which in one or more embodiments may be a USB-based connector. In addition, this connector may provide backwards compatibility to one or more existing USB technologies available today such as a USB Type-C solution in accordance with a Universal Serial Bus Type-C Cable and Connector Specification (e.g., Release 2.1 May 2021). In this way, a power delivery interface may be provided to enable a coupled device to be powered. With embodiments, wireless data signaling may be used to eliminate data conductivity issues associated with both optical and electrical contact interfaces having exposed pin and socket data connections. While embodiments described herein are in the context of a USB-based protocol, understand in other implementations the combined RF and wired communications/power delivery may be used for other communication protocols, either proprietary or according to other standards or specifications.

Thus with embodiments, exposed pin and socket data connections of a connector can be replaced with closely-coupled RF signal connections between a computing device and a cable that incorporate circuitry to enable data communications. Power and connection detection circuitry may be implemented using copper-based connections using surface contacts as opposed to pin and socket. Additionally, embodiments provide techniques for aligning and maintaining contact between the connector and the device, e.g., using a combination of structural alignment and magnetics.

At a high level, embodiments provide a "plug" and "receptacle" that are self-aligning using a combination of mechanical alignment features and magnetics. Note that these RF plug and RF receptacle do not have conventional insertion (male) and receiving (female) mechanisms, as instead a surface-based contact and alignment occur.

Wireless communication channels provide a high-speed signal path for data. In one or more embodiments, a signaling protocol can be based on existing USB bus protocols, e.g., USB4®, USB 3.2, etc., or another transport to carry existing USB bus protocols across the RF interface. In addition, wireless communication may support higher data rates than existing USB Type-C technology such that when used with a cable having RF-coupled USB connections on both ends, a future generation of USB can extend well beyond USB4 Gen4 (40 gigabits per second (Gbps)/channel). In this case, the interface may include more channels or be implemented as an optical link of higher performance.

Note that the operational characteristics of the RF channel may be adjustable and uniquely configured to associate with a specific instance of the RF-coupled USB port created by this plug and receptacle combination. In this way, multiple ports may co-exist on a given device and work with multiple cables attached to the same device.

Figure 1:
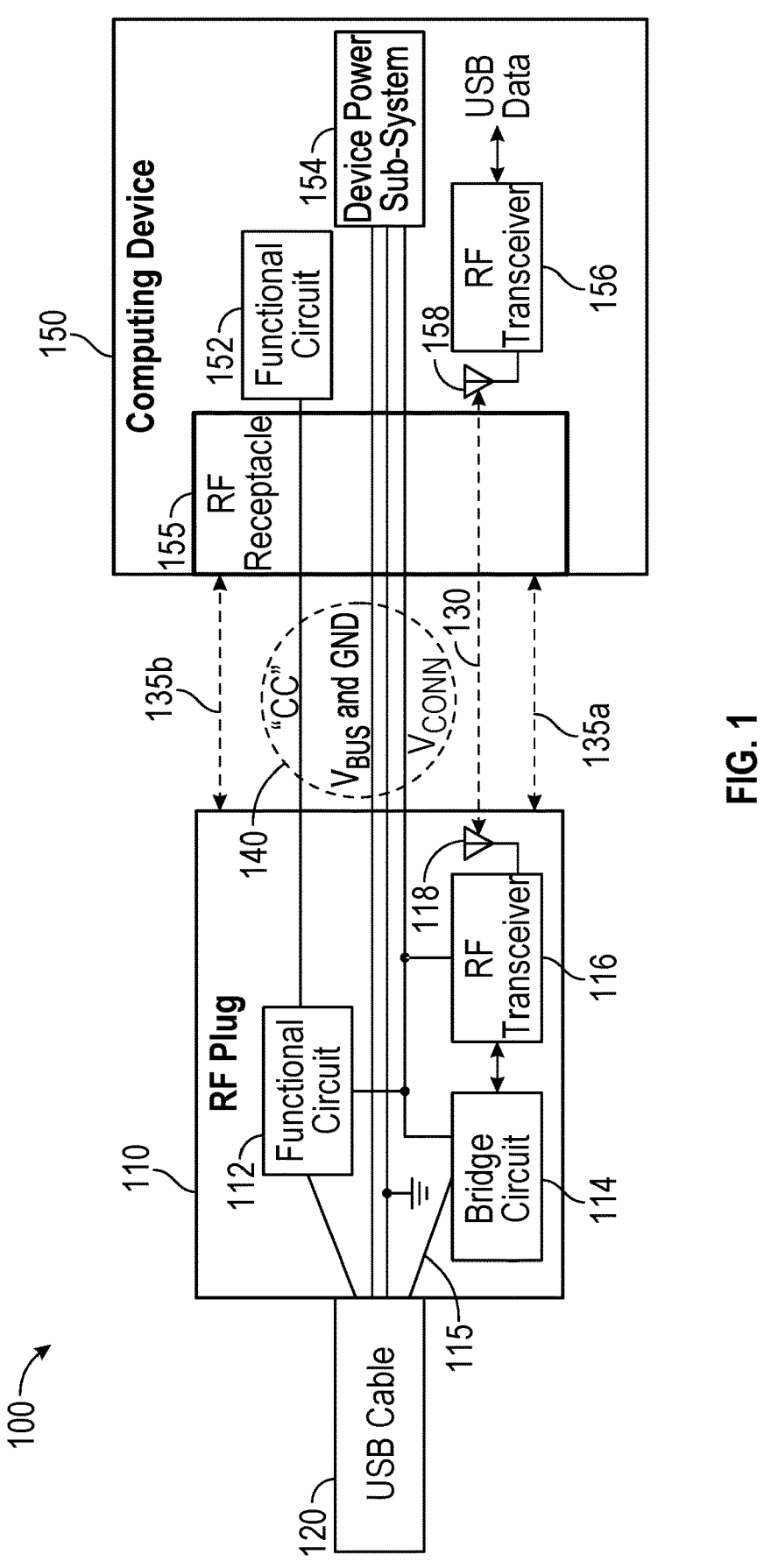
FIG. 1 is a block diagram of a computing environment in which an RF plug mates with an RF receptacle in accordance with an embodiment.

Referring now to FIG. 1, shown is a block diagram of a computing environment in which an RF plug mates with an RF receptacle in accordance with an embodiment. As shown in FIG. 1, computing environment 100 may be any type of computing arrangement in which at least one computing device couples to another device via a plug and receptacle arrangement to enable wireless communication between the devices, along with wired power and wired data communication of at least a configuration channel (CC). While the specific implementation shown in FIG. 1 is in the context of an extension to a USB protocol to provide for such wireless data communication, understand embodiments are not limited in this regard.

As shown, an RF plug 110 may be implemented at a first end of a cable 120, which in an embodiment may be a USB-based cable. As will be described further herein, data may travel through this cable between this first end and a second end (not shown in FIG. 1) in one or more of electrical, optical or RF manners. While not shown in FIG. 1, understand that at the second end of cable 120, a conventional USB connector, e.g., a USB Type-C connector, or another RF plug may be present.

In contrast to a conventional USB plug that connects into a conventional USB receptacle, RF plug 110 may instead align and be maintained in spatial relation with an RF receptacle 155 of a computing device 150, without its actual insertion into this receptacle. While different manners of maintaining alignment between these components may occur, in the embodiment of FIG. 1, a magnetic-based retaining mechanism $135_{a, b}$ may be used.

RF plug 110 includes a functional circuit 112 that may include circuitry to provide for USB Type-C functionality and USB power delivery (PD) functionality. In one or more embodiments, a USB PD communication protocol can be implemented within functional circuit 112 to use an USB PD over CC solution of a USB Type-C protocol. To this end, a CC line of a copper interface 140 may couple to functional circuit 112. Although in the embodiment of FIG. 1, a connection of copper interface 140 is used to perform an attach detection technique, e.g., leveraging the functionality of a USB Type-C CC connection scheme, in other cases a separate or sub-channel wireless connection may be used.

As further shown, functional circuit 112 also couples to an RF transceiver 116 that includes RF transmitter and receiver circuitry to perform wireless communication with a corresponding RF transceiver within device 150. Accordingly, RF transceiver 116 couples to an antenna 118 to enable wireless communication to occur via a wireless channel 130 between RF plug 112 and device 150.

Still with reference to RF plug 110, a bridge circuit 114 may provide bridging functionality to convert incoming RF signals to a lower data rate so they may be communicated along a data signal path 115 that routes through cable 120. In different implementations, a copper and/or optical data signal path may be provided. While not explicitly shown, understand that backwards compatibility with conventional USB signaling (e.g., USB2.0) may be accommodated either as being also carried over RF or connected via copper interface 140 in a traditional D+/D− implementation. In other cases, note that bridge circuit 114 may be an optional component, and RF signals may be communicated through cable 120, e.g., using one or more waveguide structures (not shown for ease of illustration in FIG. 1).

As briefly discussed, power may be provided via additional signal lines implemented within copper interface 140, including bus voltage and connection voltages (respectively $V_{BUS}$ and $V_{CONN}$) along with a ground connection. Such voltages may be used to provide power both to circuitry within RF plug 110 and a device (such as a peripheral device) coupled to a far end of cable 120.

As further illustrated in FIG. 1, RF receptacle 155 provides for surface alignment and mating contact with RF plug 110. Device 150, which may be any type of computing device, may include corresponding circuitry including a functional circuit 152 and an RF transceiver 156 that communicates wirelessly via an antenna 158. Such components may be implemented in the same manner as those present in RF plug 110. As further shown, a device power subsystem 154 is present and may provide voltages used to provide USB power delivery. Understand while shown at this high level in the embodiment of FIG. 1, many variations and alternatives are possible.

Figure 2:
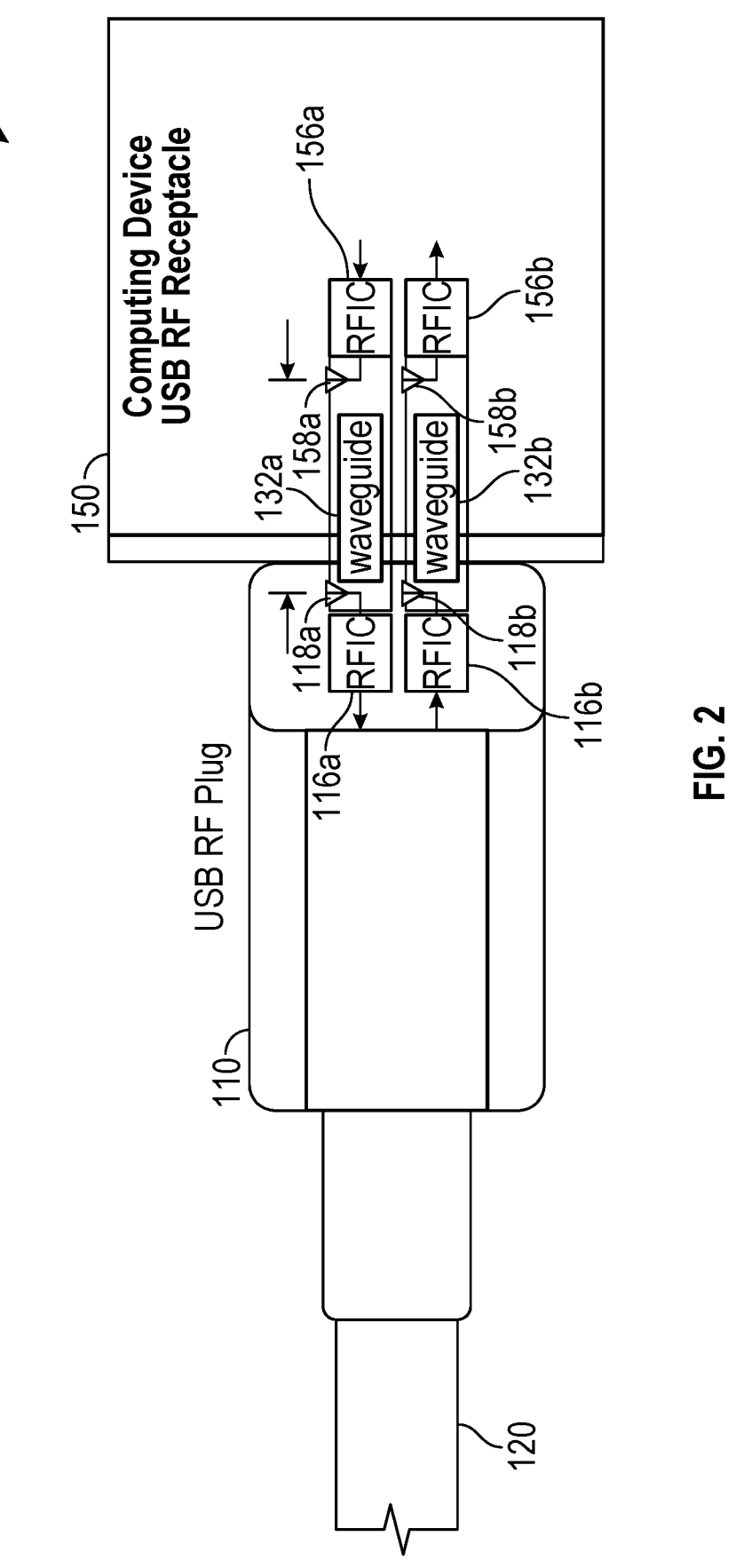
FIG. 2 is a schematic diagram illustrating a connection in accordance with an embodiment.

Referring now to FIG. 2, shown is a schematic diagram illustrating a connection in accordance with an embodiment. As shown in FIG. 2, computing environment 100 is illustrated in schematic form, where multiple wireless communication channels provided. As illustrated, two wireless communication channels may be present; of course additional communication channels may be provided in another implementation.

To enable independent wireless communication via multiple RF integrated circuits (RFICs) 116$_{a,b}$ and 156$_{a,b}$, and antennas 118$_{a,b}$ and 158$_{a,b}$, separate waveguides 132$_a$, 132$_b$ are present. While enumerated as unitary structures for convenience, note that each waveguide 132 may actually be formed of two separate waveguides formed in each of RF plug 110 and RF receptacle 150. In an embodiment, a gap of between approximately 0.0 mm and 0.2 mm may exist between the waveguides of each device. In this way, channel losses may be reduced and cross-channel isolation may be maximized. Note also that RFICs 116$_{a,b}$ (and RFICs 156$_{a,b}$) may be implemented on a single semiconductor die.

Note that the wireless communication channels may provide for wireless communication of a very short distance, e.g., 10 millimeters (mm) or less, in an embodiment. While a single wireless channel is shown in each direction in FIG. 2, there may be multiple wireless channels in each direction in other implementations. In other aspects, the arrangement shown in FIG. 2 may include similar circuitry as in FIG. 1. Furthermore, while a generally substantially linear alignment (at least in a Y-axis in the FIG. 2 illustration) between RFICs 116, 156 and antennas 118, 158, in other cases such close alignment need not occur, and these components may be located at other locations with the plug and receptacle arrangement.

In one or more embodiments, the wireless channels may operate at very high data rates, e.g., sub-terahertz (THz) levels (e.g., up to approximately 200 gigahertz (GHz). Note that antennas 118, 158 and the distance there between may be relatively minimal (e.g., antennas having an area of between approximately 0.8 mm×0.25 mm (as they may fit within the cross-section of a corresponding waveguide) and a distance between of 10 mm or less), since RF signaling may operate in the 100s of GHz range while still providing the necessary signaling distance to transit between the device and the plug. In one or more embodiments, environmental protection may be implemented using RF-transparent materials, e.g., plastic, in the device housing in the area of the receptacle and plug.

Figure 3:
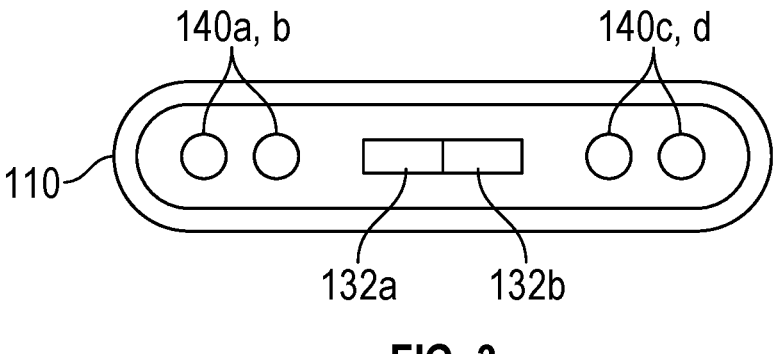
FIG. 3 is a cross section view of an RF plug in accordance with an embodiment.

Referring now to FIG. 3, shown is a cross section view of an RF plug in accordance with an embodiment. As shown in FIG. 3, RF plug 110 includes a plurality of waveguides 132$_{a,b}$ and a plurality of electrical contacts 140$_a$-140$_d$. In an embodiment, electrical contacts 140 may be implemented as surface contacts, e.g., so-called pogo pins. Of course other surface contacts may be used in other embodiments. In this implementation with two waveguides 132, a single wireless channel in each direction is provided. Similarly, with four electrical contacts 140 present, four USB signals may be communicated, namely CC, $V_{BUS}$, $V_{CONN}$ and ground signals. In other implementations, additional wired signaling, such as providing for low speed USB data signaling (e.g., D+, D− signals) to accommodate, e.g., USB 2.0 may occur in other embodiments.

While shown at this high level in the embodiment of FIG. 3, other variations are possible. For example, to provide for four wireless channels, 4 waveguides may be provided, e.g., oriented in a 2×2 matrix pattern using stacking while retaining the symmetry. In one or more embodiments, the cross-sectional area of each waveguide may be on the order of approximately 0.8 mm×0.25 mm.

A USB cable that incorporates an embodiment may be configured as either having RF-coupled plugs on both ends of the cable or an RF-coupled plug on one end and a conventional, e.g., USB Type-C, plug on the other end to enable a backwards-compatible connection.

Figure 4A:
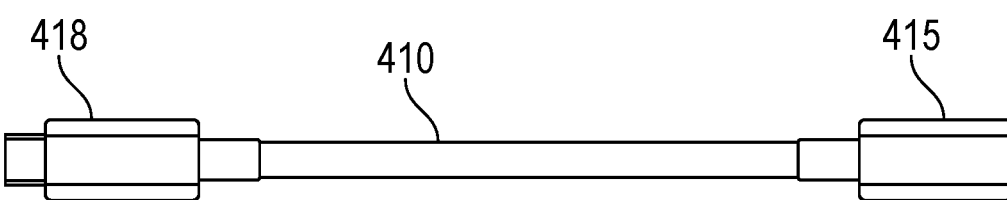
FIGS. 4A and 4B are illustrations of RF cables in accordance with an embodiment.

Referring now to FIG. 4A, shown is an illustration of a USB RF cable in accordance with an embodiment. As shown in FIG. 4A, cable 410 is implemented as a USB Type-C-to-USB RF interface. More specifically, at a first end of cable 410, an RF plug 415 is provided. As described herein, RF plug 415 may be configured to make surface-to-surface contact with a corresponding USB RF receptacle of a device. In an embodiment, RF plug 415 may include circuitry such as discussed above in FIGS. 1-3. At a second end of cable 410, a conventional USB Type-C plug 420 is provided.

As seen with this conventional plug at the a second end, insertion into a corresponding USB Type-C receptacle of another device can occur. In various embodiments, cable 410 may be implemented as an active cable (e.g., including one or more repeaters therein). In different implementations, communication through cable 410 from first end to second end may be either electrical or optical-based. In yet another implementation, it may be possible to provide wireless communication through cable 410 (when it includes waveguides along its length); however, some type of conversion via a bridging circuit back to the electrical domain occurs so that conventional USB Type-C signals (or another electrical-based USB communication protocol) may be used to provide communication to a connected device.

With this configuration, backwards compatibility is realized between a USB Type-C on one end and an RF plug in accordance with an embodiment on the other end. In one or more embodiments, cable 410 provides for magnetic alignment with a corresponding RF receptacle and surface power contacts for power delivery. Cable 410 may enable wireless data communication at speeds between approximately 20 Gbps and 80 Gbps, in embodiments.

Figure 4B:
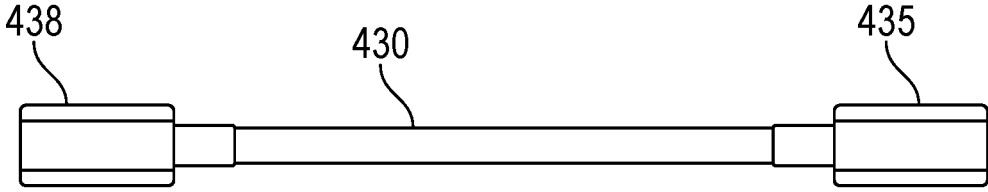

Referring now to FIG. 4B, shown is an illustration of a USB RF cable in accordance with another embodiment. As shown in FIG. 4B, cable 430 is implemented as a USB RF-to-USB RF interface. More specifically, at both ends of cable 430, RF plugs 435, 438 are provided. In an embodiment, RF plugs 435, 438 may include circuitry such as discussed above in FIGS. 1-3. In one or more embodiments, cable 430 provides for magnetic alignment with a corresponding RF receptacle and surface power contacts for power delivery. With this arrangement, higher performance data connections beyond the capabilities of USB Type-C may be realized. For example, cable 430 may enable wireless data communication at speeds between approximately 20 Gbps and 200 Gbps, in embodiments.

Figure 5:
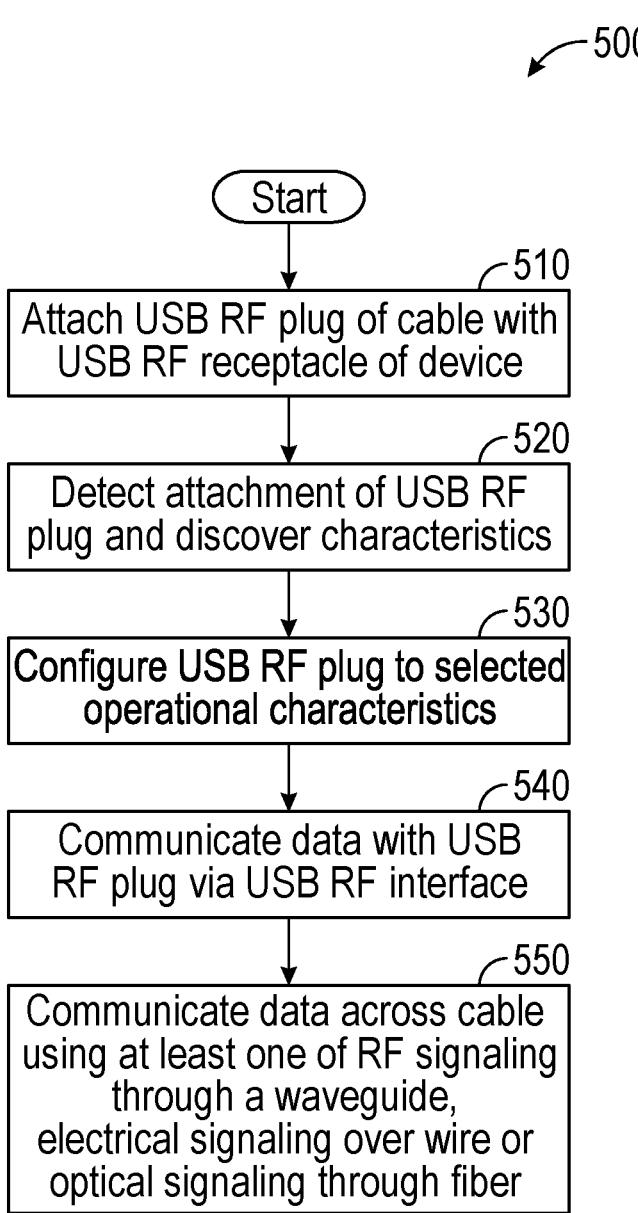
FIG. 5 is a flow diagram of a method in accordance with an embodiment.

Referring now to FIG. 5, shown is a flow diagram of a method in accordance with an embodiment. More specifically, method 500 is a method for configuring and communicating using a USB RF plug and receptacle arrangement in accordance with an embodiment. As such, method 500 may be performed, at least in part, by circuitry present in or coupled to the RF plug and receptacle, and may be performed by hardware circuitry alone, or in combination with firmware and/or software.

As illustrated, method 500 begins by attachment of the USB RF plug of the cable with a USB RF receptacle of a device, such as any computing device that can provide power, e.g., according to a USB PD arrangement (block 510). Note that this attachment is via some type of mechanical and/or magnetic alignment to align and enable retention of the RF plug in surface contact with the RF receptacle. However, in contrast to conventional USB plugs of USB cables, the plug does not insert into the receptacle.

Next at block 520, attachment of the RF plug may be detected, e.g., using USB Type-C detection circuitry present within the receptacle itself or the device. Still further at block 520, characteristics discovery may occur by way of configuration communications, e.g., on a CC channel.

Next at block 530, the USB RF plug may be configured to operate according to selected operational characteristics. Although embodiments are not limited in this regard, such characteristics may include communication speeds, and indication of appropriate connection, since a plug can be connected in multiple orientations and still operate properly by way of symmetrical location of waveguides and contacts as described herein. In addition, in one or more embodiments, the characteristics may further include operational modes such as whether the plug/cable is enabled for full operation versus some form of lower power operation versus a suspend state. At this point, the device and plug are properly configured to be able to communicate during normal operation.

Thus as further illustrated in FIG. 5 at block 540, communication of data may occur with the RF plug via a USB RF interface using RFIC circuitry present in the RF plug and RF receptacle. As shown at block 540, wireless communication between the RF plug and a device including the RF receptacle may occur.

To enable data to be communicated to the far end of the USB RF cable, data received wirelessly from the device may be communicated along the cable according to one or more of electrical, optical or wireless (RF) manners (block 550). This is so since as described above, depending upon a particular USB RF cable, one or more data paths, namely, one or more copper, optical, or RF (e.g., waveguides) paths may be provided. The selected communication technique(s) may be based on available resources within the USB cable, and a type of data that is appropriate for a plug and device connected to a far end of the USB cable. Understand while shown at this high level in the embodiment of FIG. 5, many variations and alternatives are possible.

Embodiments may avoid susceptibility to moisture and contaminate degradation by eliminating a conventional receptacle opening on a device side, thus reducing susceptibility of pin and socket solutions to moisture and contaminants.

Figure 6:
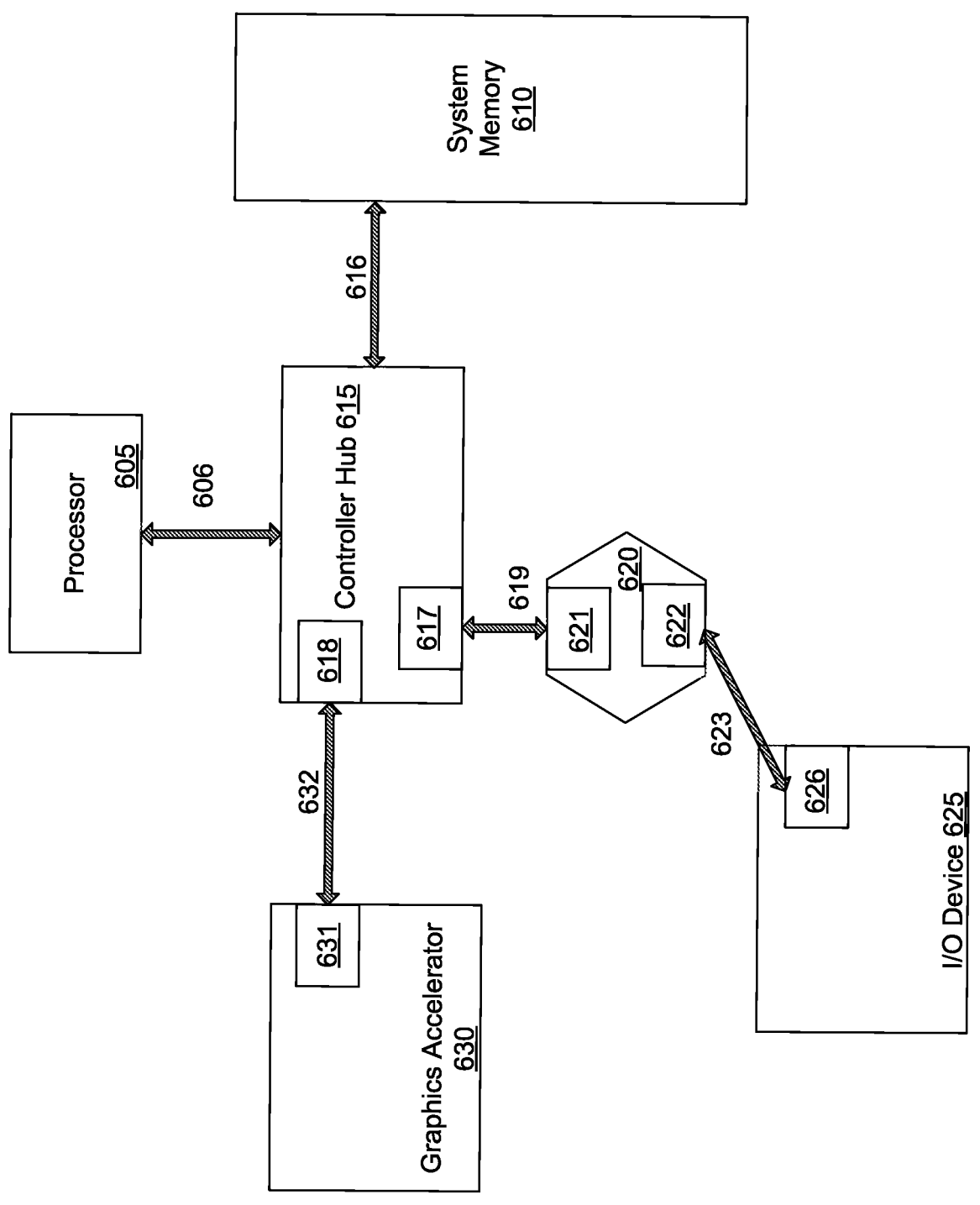
FIG. 6 is an embodiment of a fabric composed of point-to-point links that interconnect a set of components.

Embodiments may be implemented in a wide variety of systems. Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through a link 606, such as an Intel® Ultra Path Interconnect serial point-to-point interconnect.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Examples of controller hub 615 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620. Switch/bridge 620 couples to a device 625 through an interconnect 623 (e.g., a USB-based link that may provide for one or more of wired, optical and wireless channels) via corresponding interfaces/ports 622 and 626, one or more of which may include RF plugs and receptacles as described herein.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Device 625 may be any peripheral including any internal or external device or component to be coupled to an electronic system e.g., via a USB4 or other serial interface. Device 625 may be an I/O device, a NIC, an add-in card, an audio processor, a network processor, a memory expander, a hard-drive, a storage device such as a solid state drive, a CD/DVD ROM, a monitor, a printer, a mouse, a keyboard, a router, a portable storage device, a Firewire device, a USB device, a scanner, and other input/output devices.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
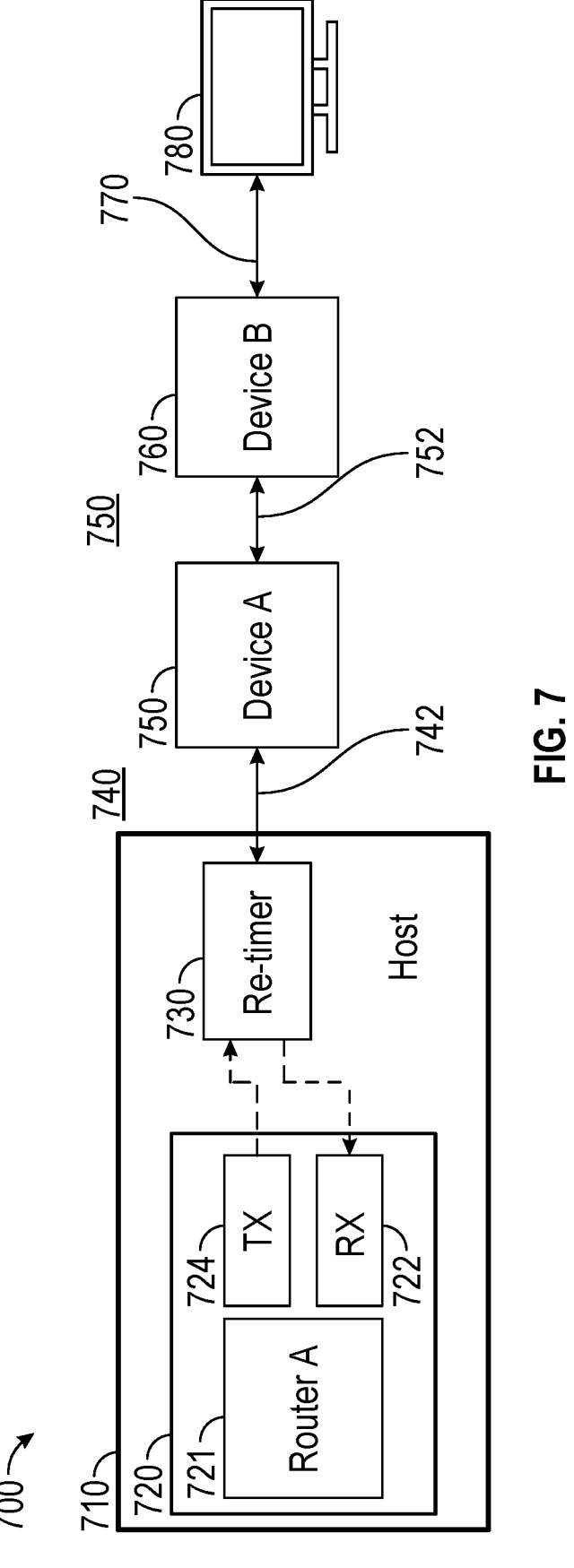
FIG. 7 is a block diagram of a computing environment in accordance with another embodiment.

Referring now to FIG. 7, shown is block diagram of a computing environment in accordance with another embodiment. As shown in FIG. 7, computing environment 700 includes a host system 710. In various embodiments, host system 710 may be a personal computer such as a desktop computer, portable computer, tablet computer or so forth. Of course in other implementations the host system may be another type of computing platform, including but not limited to server systems, embedded systems or so forth. As shown, host system 710 couples to a device 750 (Device A) via a link 740. As one example, device 750 may be implemented as a docking station or other device in communication with host system 710. In the embodiment of FIG. 7, link 740 may be implemented as a serial link, e.g., a USB4 link having a main link 742.

While many components of host system 710 are not illustrated, including a host processor such as a central processing unit (CPU) or other system-on-chip (SoC), memory, storage such as a non-volatile memory and so forth, an interface circuit 720 is illustrated. As shown, interface circuit 720 may be a serial bus interface that includes a router 721 and corresponding receive and transmit circuits (respectively 722, 724). In turn, interface circuit 720 couples to a re-timer 730 that in turn communicates with device 750 via serial link 740. In the illustration of FIG. 7, link 740 may be implemented as a USB or other high speed link that may leverage embodiments as described herein.

As further shown in FIG. 7, an additional agent or device 760 (Device B) couples to device 750 via another serial link 755 including a main link 756. A display 780 couples to device 760 via yet another link 770, e.g., another USB link.

Figure 8:
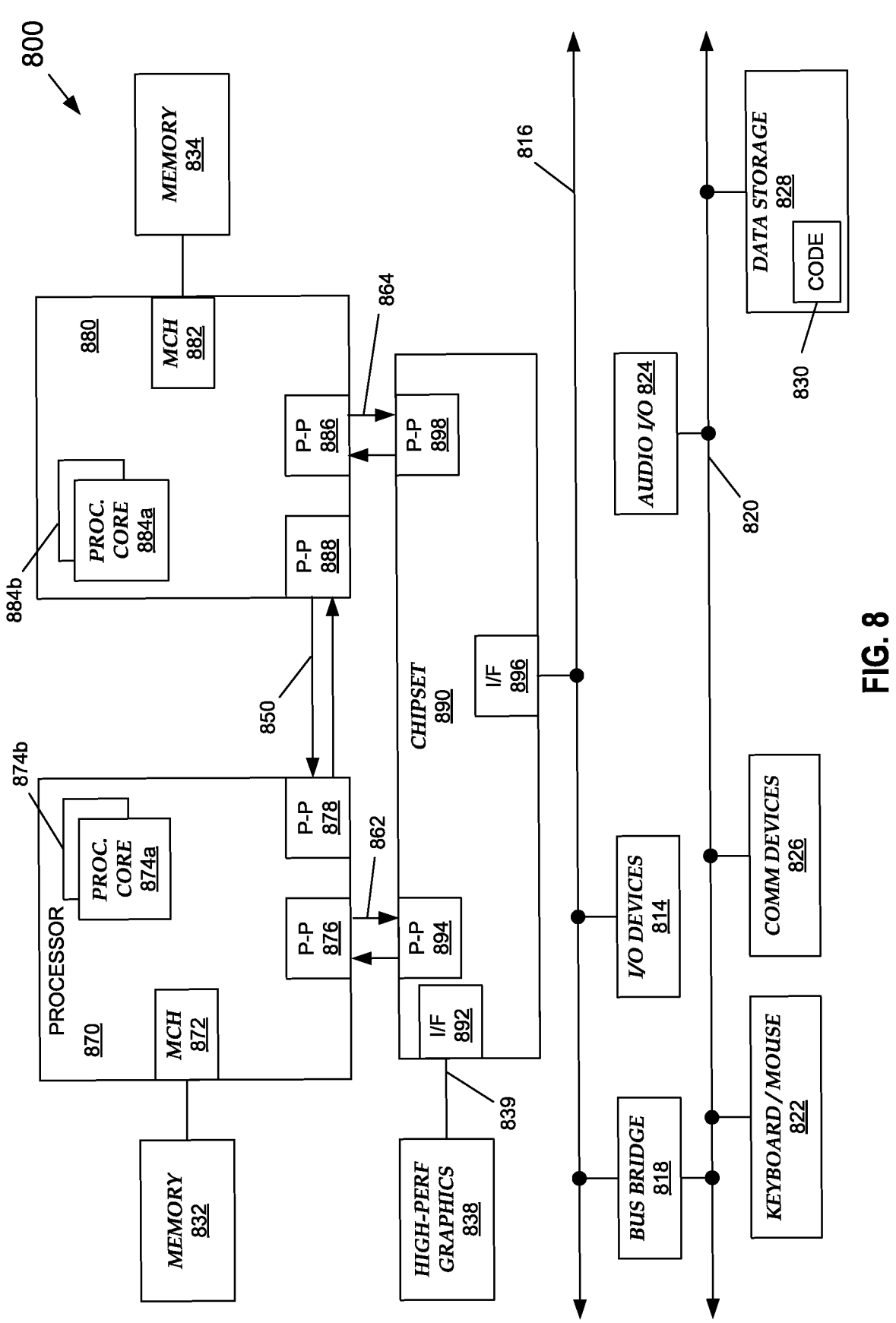
FIG. 8 is a block diagram of a system in accordance with an embodiment.

Referring now to FIG. 8, shown is a block diagram of a system in accordance with an embodiment. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874a and 874b and processor cores 884a and 884b).

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to a first bus 816, along with a bus bridge 818 which couples first bus 816 to a second bus 820. One or more of I/O devices 814 may couple to system 800 via a USB interface implementing an RF plug and RF receptacle surface mating arrangement, as described herein.

Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments.

In one example, an apparatus comprises: a first RF circuit to transmit and receive first data signals of a first RF channel; a first antenna coupled to the first RF circuit to communicate the first data signals via the first RF channel; an electrical interface to communicate power delivery signaling and configuration channel signaling of a USB protocol; and an alignment mechanism to enable the apparatus to surface mate with a device having another RF circuit and a power delivery circuit, the alignment mechanism to enable the apparatus to be retained in surface alignment with the device.

In an example, the apparatus comprises a cable, the cable comprising a bridge circuit coupled to the first RF circuit to communicate the first data signals with the first RF circuit and to convert the first data signals to a different data rate for communication via one of an electrical data path or an optical data path of the cable.

In an example, the apparatus further comprises a first waveguide through which the first data signals are communicated.

In an example, the first waveguide and a second waveguide included in a receptacle of the device provide the first wireless channel via which RF signals are communicated between a plug of the cable and the receptacle.

In an example, the first waveguide extends through the cable to enable wireless communication of the first data signals through the cable.

In an example, the alignment mechanism comprises a magnetic alignment device.

In an example, the electrical interface comprises a plurality of surface contacts to communicate the power delivery signaling and the configuration channel signaling of the USB protocol.

In an example, the first RF circuit comprises a first RFIC to transmit RF signals of the first data signals and a second RFIC to transmit second RF signals of second data signals.

In an example, the apparatus further comprises a first die comprising the first RFIC and the second RFIC.

In an example, the apparatus comprises a USB RF plug to mate with the device comprising a USB RF receptacle, where the USB RF plug is retained in the surface alignment with the USB RF receptacle.

In an example, the USB RF plug is symmetrical and the USB RF plug may be adapted in surface alignment with the USB RF receptacle in a first orientation or a second orientation.

In another example, a method comprises: detecting, in a computing device, attachment of a surface connector to the computing device and discovering one or more operational characteristics of the surface connector via a wired configuration channel; configuring the surface connector to communicate with the computing device via at least one wireless channel based on the one or more operational characteristics; and communicating data with the surface connector via the at least one wireless channel.

In an example, the method further comprises maintaining the surface connector in alignment with a surface receptacle of the computing device via at least one of a magnetic member or a mechanical member.

In an example, the method further comprises communicating second data with the surface connector via a wired channel.

In an example, the method further comprises providing power to a second device coupled to the computing device via a cable comprising the surface connector.

In an example, the method further comprises communicating the data from the surface connector to a second end of the cable wirelessly.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a computing device comprises: at least one processor; at least one memory coupled to the at least one processor; a RF receptacle to enable surface attachment of a RF connector of a cable; a first RF transceiver to transmit and receive first data signals of a first RF channel formed between the RF receptacle and the RF connector; a first antenna coupled to the first RF transceiver, the first antenna to communicate the first data signals via the first RF channel; a power delivery circuit to deliver power via the cable to a device coupled to the cable; and an electrical interface to couple to the power delivery circuit, the electrical interface comprising a first electrical contact to communicate the power and a second electrical contact to communicate configuration channel signaling of a USB protocol.

In an example, the computing device further comprises an alignment mechanism to enable the surface attachment of the RF connector.

In an example, the computing device further comprises a waveguide matrix comprising a plurality of waveguides, each of the plurality of waveguides to form a wireless channel with a corresponding waveguide included in the RF connector.

In an example, when the cable is in the surface attachment, the first antenna is spatially separated from a second antenna of the RF connector by less than approximately 10 millimeters, and the first data signals are communicated at a speed up to approximately 200 gigabits per second.

In another example, an apparatus comprises: first RF means for transmitting and receiving first data signals of a first RF channel; first antenna means coupled to the first RF means for communicating the first data signals via the first RF channel; electrical interface means for communicating power delivery signaling and configuration channel signaling of a USB protocol; and alignment means for surface mating the apparatus with a device having another RF means and a power delivery means.

In an example, the apparatus further comprises retention means for maintaining the apparatus in surface alignment with the device.

In an example, the apparatus comprises cable means comprising bridge means for communicating the first data signals with the first RF means and converting the first data signals to a different data rate for communication via one of an electrical data path means or an optical data path means.

In an example, the apparatus further comprises first waveguide means for communicating the first data signals.

Understand that various combinations of the above examples are possible.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:

a first radio frequency (RF) circuit to transmit and receive first data signals of a first RF channel;

a first antenna coupled to the first RF circuit, the first antenna to communicate the first data signals via the first RF channel;

an electrical interface to communicate power delivery signaling and configuration channel signaling of a Universal Serial Bus (USB) protocol; and an alignment mechanism to enable the apparatus to surface mate with a device having another RF circuit and a power delivery circuit, the alignment mechanism to enable the apparatus to be retained in surface alignment with the device.

2. The apparatus of claim 1, wherein the apparatus comprises a cable, the cable comprising a bridge circuit coupled to the first RF circuit to communicate the first data signals with the first RF circuit and to convert the first data signals to a different data rate for communication via one of an electrical data path or an optical data path of the cable.

3. The apparatus of claim 2, further comprising a first waveguide through which the first data signals are communicated.

4. The apparatus of claim 3, wherein the first waveguide and a second waveguide included in a receptacle of the device provide the first wireless channel via which RF signals are communicated between a plug of the cable and the receptacle.

5. The apparatus of claim 3, wherein the first waveguide extends through the cable to enable wireless communication of the first data signals through the cable.

6. The apparatus of claim 1, wherein the alignment mechanism comprises a magnetic alignment device.

7. The apparatus of claim 1, wherein the electrical interface comprises a plurality of surface contacts to communicate the power delivery signaling and the configuration channel signaling of the USB protocol.

8. The apparatus of claim 1, wherein the first RF circuit comprises a first RF integrated circuit (RFIC) to transmit RF signals of the first data signals and a second RFIC to transmit second RF signals of second data signals.

9. The apparatus of claim 8, further comprising a first die comprising the first RFIC and the second RFIC.

10. The apparatus of claim 1, wherein the apparatus comprises a USB RF plug to mate with the device comprising a USB RF receptacle, wherein the USB RF plug is retained in the surface alignment with the USB RF receptacle.

11. The apparatus of claim 10, wherein the USB RF plug is symmetrical and wherein the USB RF plug may be adapted in surface alignment with the USB RF receptacle in a first orientation or a second orientation.

12. A method comprising:

detecting, in a computing device, attachment of a surface connector to the computing device and discovering one or more operational characteristics of the surface connector via a wired configuration channel of an electrical interface, the electrical interface to communicate power delivery signaling and the configuration channel signaling of a Universal Serial Bus USB) protocol;

configuring the surface connector to communicate with the computing device via at least one wireless channel based on the one or more operational characteristics; and communicating data with the surface connector via the at least one wireless channel.

13. The method of claim 12, further comprising maintaining the surface connector in alignment with a surface receptacle of the computing device via at least one of a magnetic member or a mechanical member.

14. The method of claim 12, further comprising communicating second data with the surface connector via a wired channel.

15. The method of claim 12, further comprising providing power to a second device coupled to the computing device via a cable comprising the surface connector.

16. The method of claim 15, further comprising communicating the data from the surface connector to a second end of the cable wirelessly.

17. A computing device comprising:

at least one processor;

at least one memory coupled to the at least one processor;

a radio frequency (RF) receptacle to enable surface attachment of a RF connector of a cable;

a first RF transceiver to transmit and receive first data signals of a first RF channel formed between the RF receptacle and the RF connector;

a first antenna coupled to the first RF transceiver, the first antenna to communicate the first data signals via the first RF channel;

a power delivery circuit to deliver power via the cable to a device coupled to the cable; and an electrical interface to couple to the power delivery circuit, the electrical interface comprising a first electrical contact to communicate the power and a second electrical contact to communicate configuration channel signaling of a Universal Serial Bus (USB) protocol.

18. The computing device of claim 17, further comprising an alignment mechanism to enable the surface attachment of the RF connector.

19. The computing device of claim 17, further comprising a waveguide matrix comprising a plurality of waveguides, each of the plurality of waveguides to form a wireless channel with a corresponding waveguide included in the RF connector.

20. The computing device of claim 17, wherein when the cable is in the surface attachment, the first antenna is spatially separated from a second antenna of the RF connector by less than approximately 10 millimeters, and the first data signals are communicated at a speed up to approximately 200 gigabits per second (Gbps).

* * * * *